Patented Feb. 19, 1946

2,395,070

UNITED STATES PATENT OFFICE 2,395,070

CHLORINE CONTAINING CARBONIC ESTER-SYNTHETIC RUBBER COMPOSITION

Donald V. Sarbach, Cuyahoga Falls, Ohio, assignor to The B. F. Goodrich Company, New York, N. Y., a corporation of New York No Drawing. Application June 10, 1943, Serial No. 490,331

9 Claims. (Cl. 260—36)

This invention relates to compositions comprising synthetic rubber of the type prepared by the polymerization of butadiene-1,3 hydrocarbons either alone, in admixture with each other or in admixture with copolymerizable mono-olefinic compounds, and has as its principal object to provide synthetic rubber compositions of improved properties and of greater usefulness to the rubber industry.

It is known that synthetic rubber of the butadiene-1,3 polymer and copolymer type is inherently deficient in tackiness and adhesive properties and as a result thereof it is difficult to fabricate articles wherein the synthetic rubber is tightly adhered to itself or to other materials. This same lack of adhesive properties manifests itself in adhesive compositions such as synthetic rubber cements rendering such cements much less useful than natural rubber cements. Such cements also possess the disadvantage of gelling much more rapidly than natural rubber cements.

I have now discovered that these and other deficiencies of synthetic rubber may be overcome to a remarkable extent by the incorporation therein of chlorine containing esters of a carbonic acid and a monohydric alcohol. Thus it has been found that such esters greatly improve the tackiness and adhesiveness of synthetic rubber compositions containing them regardless of whether the composition be a solid composition or a liquid adhesive composition such as a cement. In the case of cements it has also been found that such esters function as gel resisters preventing undesirable gelling of the cement. Moreover such esters are softeners or plasticizers for the synthetic rubber thereby making it easy to process and to compound even at the high temperatures which cannot ordinarily be used for processing, and, although softeners, they do not adversely affect the physical properties of vulcanizates obtained from compositions containing them as do many of the softeners ordinarily used with synthetic rubber.

This invention is accordingly directed to synthetic rubber compositions comprising a rubbery polymer of a butadiene-1,3 hydrocarbon or a copolymer of such a hydrocarbon with a copolymerizable mono-olefinic compound, together with a chlorine containing ester of a carbonic acid and a monohydric alcohol.

The chlorine containing ester employed may be any ester of metacarbonic acid,

(commonly called carbonic acid and hereinafter designated as carbonic acid), orthocarbonic acid, $C-(OH)_4$, or chloro carbonic acid,

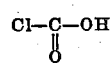

with any monohydric alcohol such as an aliphatic, aromatic, alicyclic, or heterocyclic monohydric alcohol, provided, of course, that the ester contains at least one chlorine atom in either the acid or alcohol residue. Typical examples of such chlorine containing esters include the chlorinated alkyl esters of carbonic acid wherein the chlorinated-alkyl radical replaces either one or both of the hydrogens of the acid such as mono alpha-chloroethyl carbonate, mono alpha-chloro butyl carbonate, ethyl alpha-chloro ethyl carbonate, ethyl alpha-beta-dichloroethyl carbonate, bis-(alpha-beta-beta-beta-tetrachloroethyl) carbonate, di-(alpha-chlorobutyl) carbonate, di-(alpha-beta-dichlorobutyl) carbonate di-(alpha-chlorooctyl) carbonate, di-(alpha-chloroisoamyl) carbonate, chlorinated octyl butyl carbonates and the like; the chlorinated alkyl esters of orthocarbonic acid such as the chlorinated ethyl or butyl orthocarbonates and the alkyl or chlorinated alkyl esters of chlorocarbonic acid such as the methyl, ethyl, propyl, isoamyl, butyl and octyl esters of chlorocarbonic acid, alpha-beta dichloroethyl chlorocarbonate, chlorobutyl chlorocarbonate and the like. Other esters of the general structure

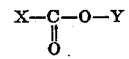

wherein at least one of X and Y contains at least one chlorine atom, X is Cl, OH or O—Y and Y is a hydrocarbon or chlorinated hydrocarbon radical, may also be employed.

All of the above-described chlorine-containing esters are well known to the art and may be prepared by methods known to the art. The chlorinated alkyl carbonates may be prepared, for example, by reacting the corresponding alkyl carbonates with chlorine in the manner customarily used for chlorinating organic compounds. The esters of chlorocarbonic acid may be prepared by reacting the appropriate monohydric alcohol with phosgene.

The preferred chlorine containing esters for use in this invention are the chlorinated alkyl carbonates which contain at least 10% by weight of chlorine and preferably from 20 to 80% by weight of chlorine. Esters of this type which possess boiling points greater than about 175° C. such as the chlorinated alkyl carbonates containing from 6 to 18 carbon atoms are particularly preferred. Chlorinated di-butyl, di-octyl, di-isoamyl, di-hexyl, octyl butyl and similar carbonates containing 20 to 80% by weight of chlorine are especially useful materials in this class.

The synthetic rubber employed may be any of the rubbery polymers of butadiene-1,3 hydrocarbons such as butadiene-1,3, isoprene, 2,3-dimethyl butadiene-1,3, piperylene or the like, or any rubbery copolymers of such butadiene-1,3 hydrocarbons with each other or with one or more copolymerizable mono-olefinic compounds. Copolymerizable mono-olefinic compounds are organic compounds which contain a single olefinic double bond,

and which are copolymerizable with butadiene-1,3 hydrocarbons. Such compounds are usually low molecular weight compounds of less than 10 carbon atoms which contains at least two hydrogen atoms and at least one radical other than hydrogen attached to the doubly bound carbon atoms, as in the structure

where at least one of the disconnected valences is attached to a group other than hydrogen and more electronegative than hydrogen such as chlorine, alkyl, alkoxy, acyl or, as is more often the case, a group containing an unsaturated bond other than an olefinic double bond conjugated with the double bond in the

group such as an aryl group, a

group or a C≡N group. Examples of such compounds include styrene, p-methyl styrene, alpha-methyl styrene, p-chloro styrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloro acrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride and similar copolymerizable compounds containing a single olefinic double bond. Although rubbery polymers prepared by the polymerization by any desired method of a butadiene-1,3 hydrocarbon or a mixture thereof with a copolymerizable mono-olefinic compound in any desired proportions (providing a rubbery material is the product) may be used, the synthetic rubbers which are ordinarily employed in this invention are those prepared by the copolymerization in aqueous emulsion of butadiene-1,3 with a lesser amount of styrene, acrylonitrile or an acrylic ester or by the copolymerization of butadiene-1,3 and isobutylene. Such copolymers are known commercially under such names as "Ameripol," "Hycar," "Perbunan," "Buna S," "GR-S," "Chemigum," "Butyl," "Flexon," etc.

The incorporation of the chlorine-containing ester with the synthetic rubber may be effected by any desired method as by adding the ester while the rubber is being worked on a roll mill, masticating a mixture of the rubber and the ester in an internal mixer or adding the softener to a solution of the synthetic rubber such as a cement or a dispersion of the synthetic rubber such as a synthetic latex. Obviously other materials such as softeners, pigments, fillers, vulcanizing agents, accelerators, antioxidants and even other rubbery materials such as natural rubber may also be included in the compositions of this invention together with the chlorine containing carbonic ester and the synthetic rubber.

The amount of the chlorine containing carbonic ester to be used in any given instance will depend upon the particular synthetic rubber employed and the particular properties desired in the composition, and may be varied widely. When it is desired to produce a solid synthetic rubber composition which is plastic and easily worked and which possesses excellent tackiness and adhesive properties, it is generally desirable to use from 5 to 50 parts or even more of the ester for each 100 parts of the synthetic rubber. In synthetic rubber cements on the other hand it has been found that the addition of as little as 1 part of the ester for each 100 parts of synthetic rubber in the cement will retard gelling of the cement and increase its adhesive properties. Thus it may be said that amounts varying from 1 part of the ester per 100 of synthetic rubber to equal parts of the ester and the synthetic rubber offer advantages.

In order further to illustrate the use of chlorinated esters of carbonic acids in synthetic rubber the following examples of compositions comprising such esters and a butadiene-1,3 acrylonitrile copolymer synthetic rubber are set forth but it is to be understood that the same results are obtained when working with other synthetic rubbers of the character described, the butadiene-1,3 acrylonitrile copolymer being used in the examples because greatest difficulties in producing plastic, easily processed compositions which are tacky and adhesive and in producing adhesive non-gelling cements are encountered with this synthetic rubber.

*Example I*

A synthetic rubber composition is prepared by incorporating on a roll mill 50 parts by weight of chlorinated di-n-octyl carbonate containing approximately 45% by weight of chlorine in 100 parts by weight of a rubbery copolymer prepared by copolymerizing in aqueous emulsion 55 parts by weight of butadiene-1,3 and 45 parts by weight of acrylonitrile. The chlorinated ester adds to the synthetic rubber to produce a plastic, quite tacky batch which may be processed at temperatures somewhat higher than is ordinarily possible with this copolymer. The composition is then mixed with conventional compounding and vulcanizing ingredients including carbon black, zinc oxide, sulfur and a vulcanization accelerator, all of which are found to be readily dispersed in the composition, and the composition is then vulcanized in a mold. An excellent vulcanizate which is free from the laminations and flow cracks ordinarily produced in vulcanizates of this synthetic rubber due to the inability of the polymer to stick or fuse to itself, is obtained. Moreover, the vulcanizate possesses excellent tensile strength and elongation, and retains the excellent oil-resistant characteristic of the butadiene-1,3 acrylonitrile synthetic rubber.

*Example II*

A composition is prepared by mixing the following ingredients on a two roll mixing mill:

| | Parts |
|---|---|
| Butadiene-1,3 acrylonitrile copolymer | 100 |
| Carbon black | 35 |
| Zinc oxide | 5 |
| Phenyl beta naphthylamine | 1 |
| Lauric acid | 2 |
| Benzothiazyl disulfide | 2 |
| Sulfur | 1 |
| Chlorinated dibutyl carbonate (55% chlorine) | 10 |

The composition thus obtained is much more tacky than similar compositions not containing the chlorinated dibutyl carbonate. To illustrate the improved results obtained when adhering this composition to other materials, the above composition is formed into a thin sheet, its surface is brushed with ethylene dichloride and it is then superposed on a sheeted natural rubber composition whose surface has similarly been treated with ethylene dichloride. The plied-up structure is then cured in a press with a slight squeeze. After curing, it is found that the butadiene-1,3 acrylonitrile copolymer composition is tightly adhered to the natural rubber composition. Little or no adhesion of this character is obtained, however, if the chlorinated dibutyl carbonate is not present in the butadiene-1,3 acrylonitrile copolymer composition.

*Example III*

A synthetic rubber cement is prepared by dissolving a composition containing a rubbery butadiene-1,3 acrylonitrile copolymer, channel black, zinc oxide, coal tar, phenyl-beta-naphthylamine and sulfur in a volatile organic solvent therefor such as ethylene dichloride, chlorobenzene, acetone, methyl ethyl ketone, ethyl acetate, or the like. Such a cement is unstable and gels readily, especially when the concentration of the synthetic rubber composition in the solvent is as high as about 20%. However, if 2 parts of chlorodibutyl carbonate or a similar chlorinated ester of a carbonic acid is added to the cement on to the synthetic rubber composition before it is dissolved in the solvent, it is found that gelling is remarkably retarded.

Moreover, the presence of each esters in the cement increases its tack and adhesive properties.

Although the invention has been illustrated by the foregoing examples it is to be understood that the invention is not limited solely thereto and that numerous modifications and variations which will be obvious to those skilled in the art are within the spirit and scope of the invention as defined by the appended claims.

I claim:

1. A synthetic rubber composition comprising a rubbery polymer of a butadiene-1,3 hydrocarbon, and incorporated therein, a chlorine containing ester of metacarbonic acid with a monohydric alcohol.

2. A synthetic rubber composition comprising a rubbery copolymer of a butadiene-1,3 hydrocarbon and a copolymerizable mono-olefinic compound, and, incorporated therein, a chlorine containing ester of metacarbonic acid with a monohydric alcohol.

3. A synthetic rubber composition comprising a rubbery copolymer of a butadiene-1,3 hydrocarbon and a copolymerizable mono-olefinic compound, and, in corporated therein, a chlorinated alkyl metacarbonate.

4. A synthetic rubber composition comprising a rubbery copolymer of a butadiene-1,3 hydrocarbon and a copolymerizable mono-olefinic compound, and, incorporated therein, a chlorinated di-alkyl metacarbonate containing at least 10% by weight of chlorine.

5. A synthetic rubber composition comprising a rubbery copolymer of a butadiene-1,3 hydrocarbon and a copolymerizable mono-olefinic compound, and, incorporated therein, a chlorinated di-alkyl metacarbonate containing from 6 to 18 carbon atoms and at least 10% by weight of chlorine.

6. A synthetic rubber composition comprising a rubbery copolymer of a butadiene-1,3 hydrocarbon and a copolymerizable mono-olefinic compound, and, incorporated therein, a chlorinated dibutyl metacarbonate containing from 20 to 80% by weight of chlorine.

7. A synthetic rubber composition comprising a rubbery butadiene-1,3 acrylonitrile copolymer and, incorporated therein, a chlorinated alkyl metacarbonate.

8. A synthetic rubber composition comprising a rubbery butadiene-1,3 acrylonitrile copolymer, and, incorporated therein, a chlorinated di-alkyl metacarbonate containing from 6 to 18 carbon atoms and at least 10% by weight of chlorine.

9. A synthetic rubber cement comprising a composition comprising a rubbery butadiene-1,3 acrylonitrile copolymer and a chlorinated di-alkyl metacarbonate containing from 6 to 18 carbon atoms and at least 10% by weight of chlorine, dissolved in a volatile organic solvent.

DONALD V. SARBACH.